United States Patent
Shimizu et al.

(10) Patent No.: US 9,149,977 B2
(45) Date of Patent: *Oct. 6, 2015

(54) LENS MANUFACTURING APPARATUS

(75) Inventors: Keishi Shimizu, Kanagawa (JP); Shin Yasuda, Kanagawa (JP); Yoshio Nishihara, Kanagawa (JP); Tetsuro Kodera, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 13/556,866

(22) Filed: Jul. 24, 2012

(65) Prior Publication Data

US 2013/0220217 A1     Aug. 29, 2013

(30) Foreign Application Priority Data

Feb. 28, 2012   (JP) ................................ 2012-041094

(51) Int. Cl.
| | |
|---|---|
| *B05C 9/12* | (2006.01) |
| *B29C 59/02* | (2006.01) |
| *B29D 11/00* | (2006.01) |
| *B29C 31/04* | (2006.01) |
| *B29C 35/08* | (2006.01) |

(52) U.S. Cl.
CPC ............. *B29C 59/026* (2013.01); *B29C 31/042* (2013.01); *B29D 11/00009* (2013.01); *B29C 2035/0827* (2013.01)

(58) Field of Classification Search
CPC .................................................. B29C 31/042
USPC .............. 425/115, 140, 142, 144, 145, 150, 425/174.4, 193, 195, 235, 574–576, 258, 425/292, 295, 305.1, 313, 385, 396, 425/402–403, 447, 470, 808, DIG. 108; 264/1.32, 1.34, 405, 410, 412, 264/492–496, 220, 225, 226, 284, 293
See application file for complete search history.

(56) References Cited

U.S. PATENT DOCUMENTS

| | | | |
|---|---|---|---|
| 5,650,260 A * | 7/1997 | Onishi | 430/269 |
| 6,600,162 B1 * | 7/2003 | Hahmann et al. | 250/492.1 |
| 8,845,314 B2 * | 9/2014 | Yasuda et al. | 425/115 |
| 2006/0027949 A1 * | 2/2006 | Wang et al. | 264/322 |

(Continued)

FOREIGN PATENT DOCUMENTS

| | | | | |
|---|---|---|---|---|
| JP | A-11-188866 | | 7/1999 | |
| JP | 2005088124 A * | | 4/2005 | ............. B23Q 17/24 |

(Continued)

OTHER PUBLICATIONS

Translation of JP 201175076.*

*Primary Examiner* — Yogendra Gupta
*Assistant Examiner* — Kimberly A Stewart
(74) *Attorney, Agent, or Firm* — Oliff PLC

(57) ABSTRACT

A lens manufacturing apparatus includes a conveying unit that conveys a workpiece having a sheet member and a resin base on the sheet member, an unevenness forming unit that moves a cutting blade in a direction different from the conveying direction of the workpiece and that makes a cut in the surface of the resin base to form concave and convex portions, a resin supply unit that includes nozzles supplying a lens resin to areas, in which the concave portions are not formed, between the convex portions formed on the surface of the resin base, and a resin curing unit that cures the supplied lens resin.

12 Claims, 19 Drawing Sheets

(56) References Cited

U.S. PATENT DOCUMENTS

| | | | |
|---|---|---|---|
| 2007/0090567 A1* | 4/2007 | Hwang | 264/293 |
| 2007/0200276 A1* | 8/2007 | Mackey et al. | 264/293 |
| 2007/0206084 A1 | 9/2007 | Suzuki et al. | |
| 2008/0217803 A1* | 9/2008 | Nakajima et al. | 264/132 |
| 2009/0087506 A1* | 4/2009 | Hasegawa et al. | 425/34.2 |
| 2009/0152748 A1* | 6/2009 | Wang et al. | 264/1.34 |
| 2010/0148397 A1* | 6/2010 | Nakamura et al. | 264/293 |
| 2010/0181691 A1* | 7/2010 | Yoshida | 264/1.36 |
| 2010/0229790 A1* | 9/2010 | Serizawa et al. | 118/44 |
| 2010/0247757 A1 | 9/2010 | Inoue | |
| 2011/0128315 A1 | 6/2011 | Suzuki et al. | |
| 2011/0230623 A1* | 9/2011 | Hirano et al. | 525/309 |
| 2012/0126460 A1* | 5/2012 | Shin et al. | 264/495 |
| 2013/0004726 A1* | 1/2013 | Park et al. | 428/172 |
| 2013/0295214 A1* | 11/2013 | Yoshida | 425/150 |

FOREIGN PATENT DOCUMENTS

| | | | | | |
|---|---|---|---|---|---|
| JP | 2007176039 A | * | 7/2007 | | B29C 59/02 |
| JP | A-2007-206592 | | 8/2007 | | |
| JP | 2009116139 A | * | 5/2009 | | G03B 35/00 |
| JP | A-2009-116139 | | 5/2009 | | |
| JP | 2009214387 A | * | 9/2009 | | B29C 39/18 |
| JP | A-2010-224200 | | 10/2010 | | |
| JP | A-2010-286776 | | 12/2010 | | |
| JP | 2011175076 A | * | 9/2011 | | G02B 3/08 |

* cited by examiner

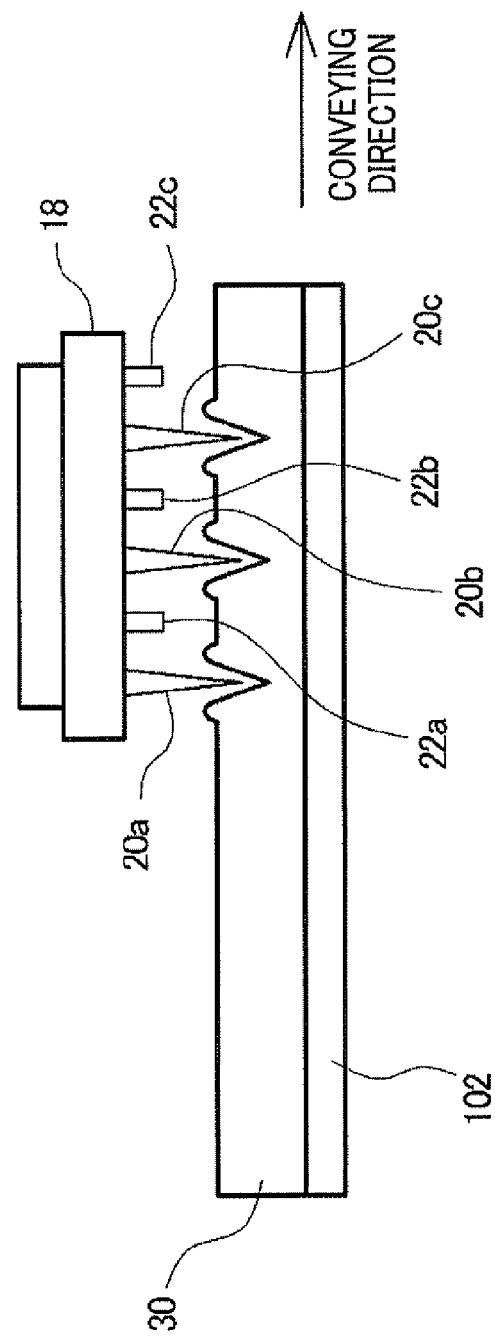

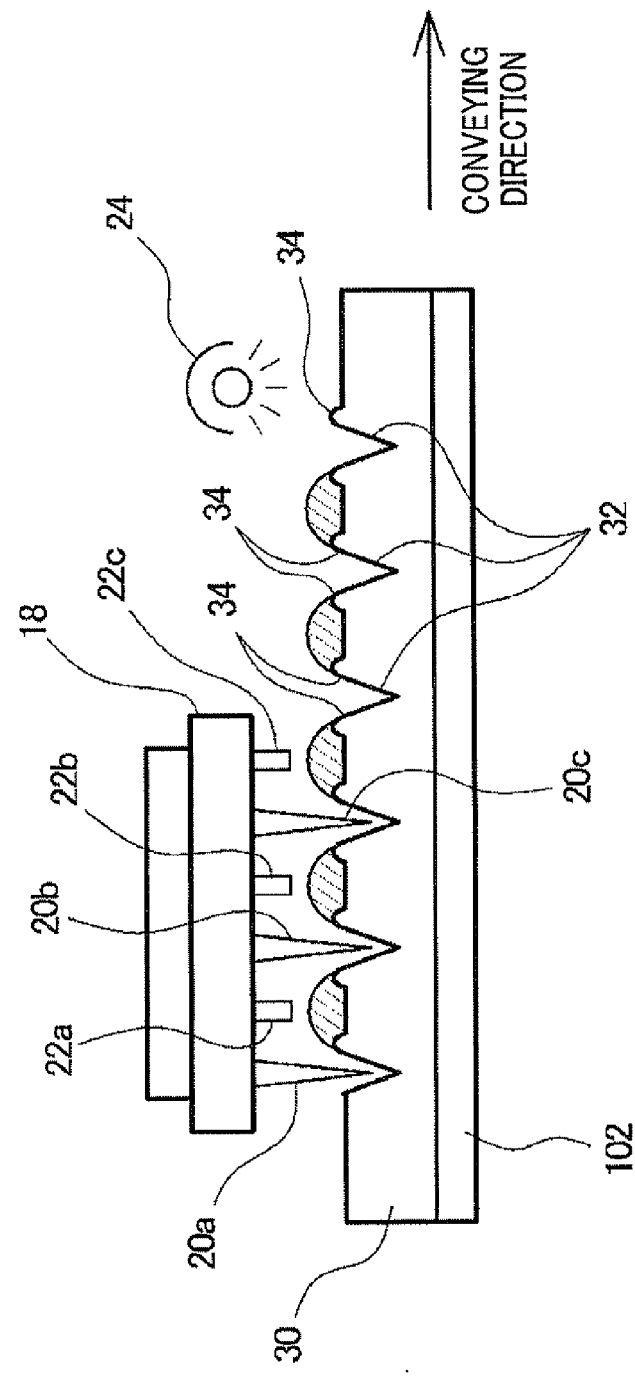

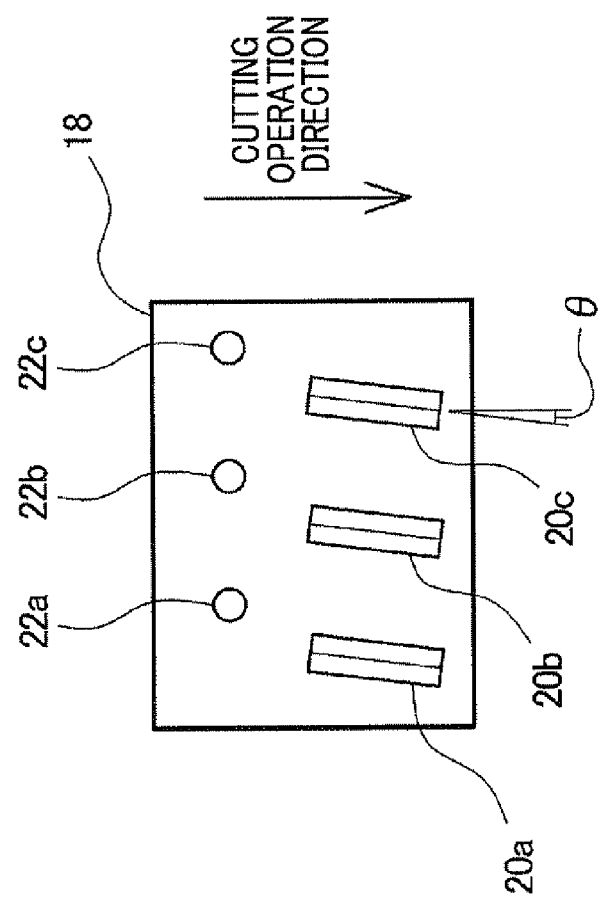

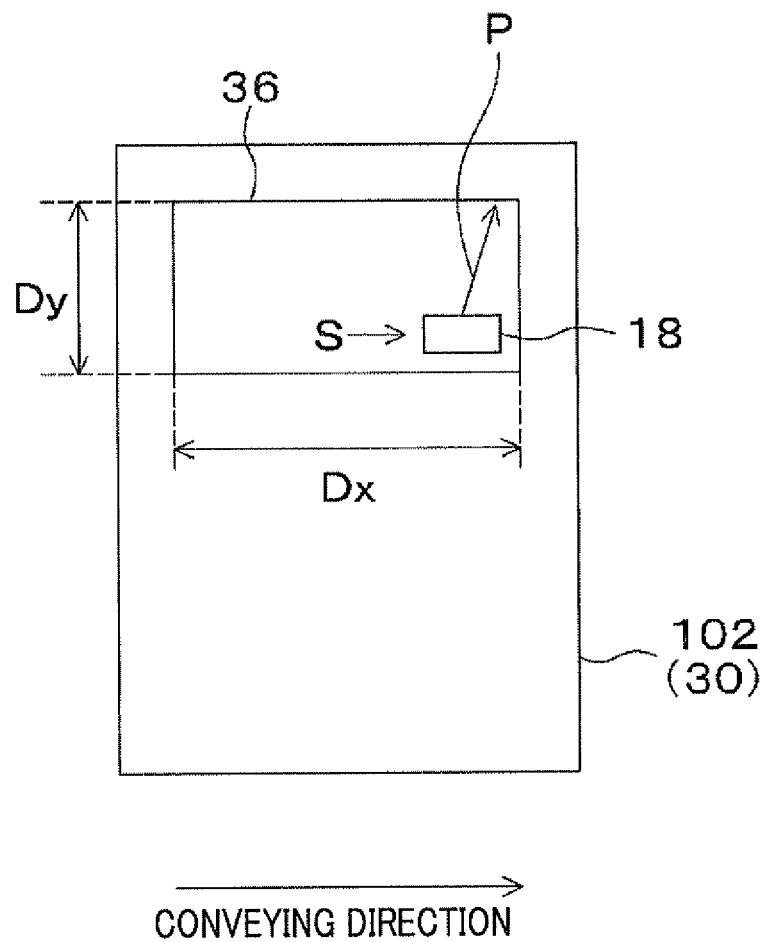

CONVEYING DIRECTION

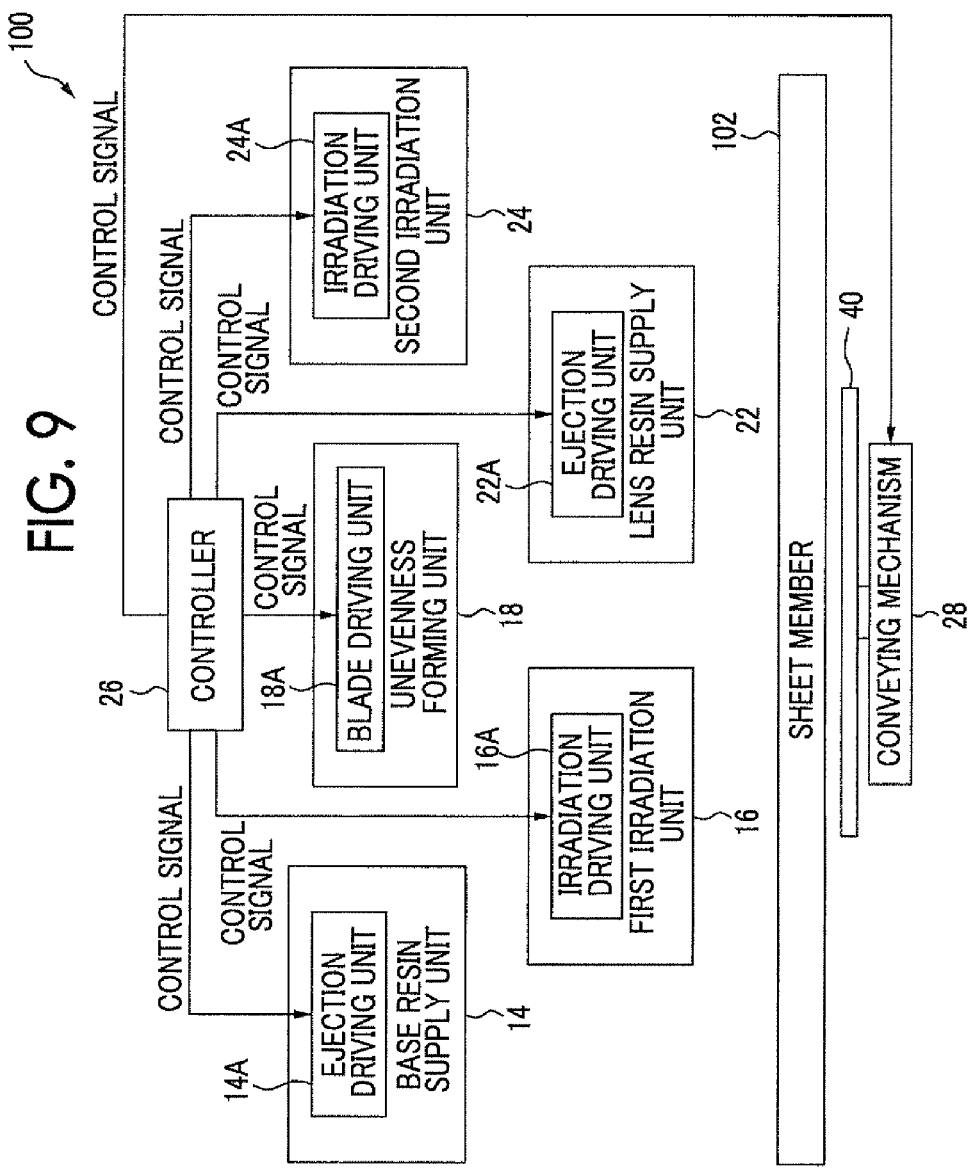

CONVEYING DIRECTION

LENS MANUFACTURING APPARATUS

CROSS-REFERENCE TO RELATED APPLICATIONS

This application is based on and claims priority under 35 USC 119 from Japanese Patent Application No. 2012-041094 filed Feb. 28, 2012.

BACKGROUND

Technical Field

The present invention relates to a lens manufacturing apparatus.

SUMMARY

According to an aspect of the invention, there is provided a lens manufacturing apparatus including: a conveying unit that conveys a workpiece having a sheet member and a resin base on the sheet member; an unevenness forming unit that moves a cutting blade in a direction different from the conveying direction of the workpiece and that makes a cut in the surface of the resin base to form concave and convex portions; a resin supply unit that has nozzles supplying a lens resin to areas, in which the concave portions are not formed, between the convex portions formed on the surface of the resin base; and a resin curing unit that cures the supplied lens resin.

BRIEF DESCRIPTION OF THE DRAWINGS

Exemplary embodiments of the present invention will be described in detail based on the following figures, wherein:

FIGS. 4A, 4B, and 4C are diagrams illustrating a lens forming step;

FIGS. 5A, 5B, and 5C are diagrams illustrating an example where lenses are formed on parallax images according to the exemplary embodiment;

FIG. 9 is a block diagram illustrating another functional configuration of the lens manufacturing apparatus according to the exemplary embodiment;

DETAILED DESCRIPTION

Hereinafter, an embodiment (hereinafter, referred to as an exemplary embodiment) for carrying out the invention will be described with reference to the accompanying drawings.

Figure 1:
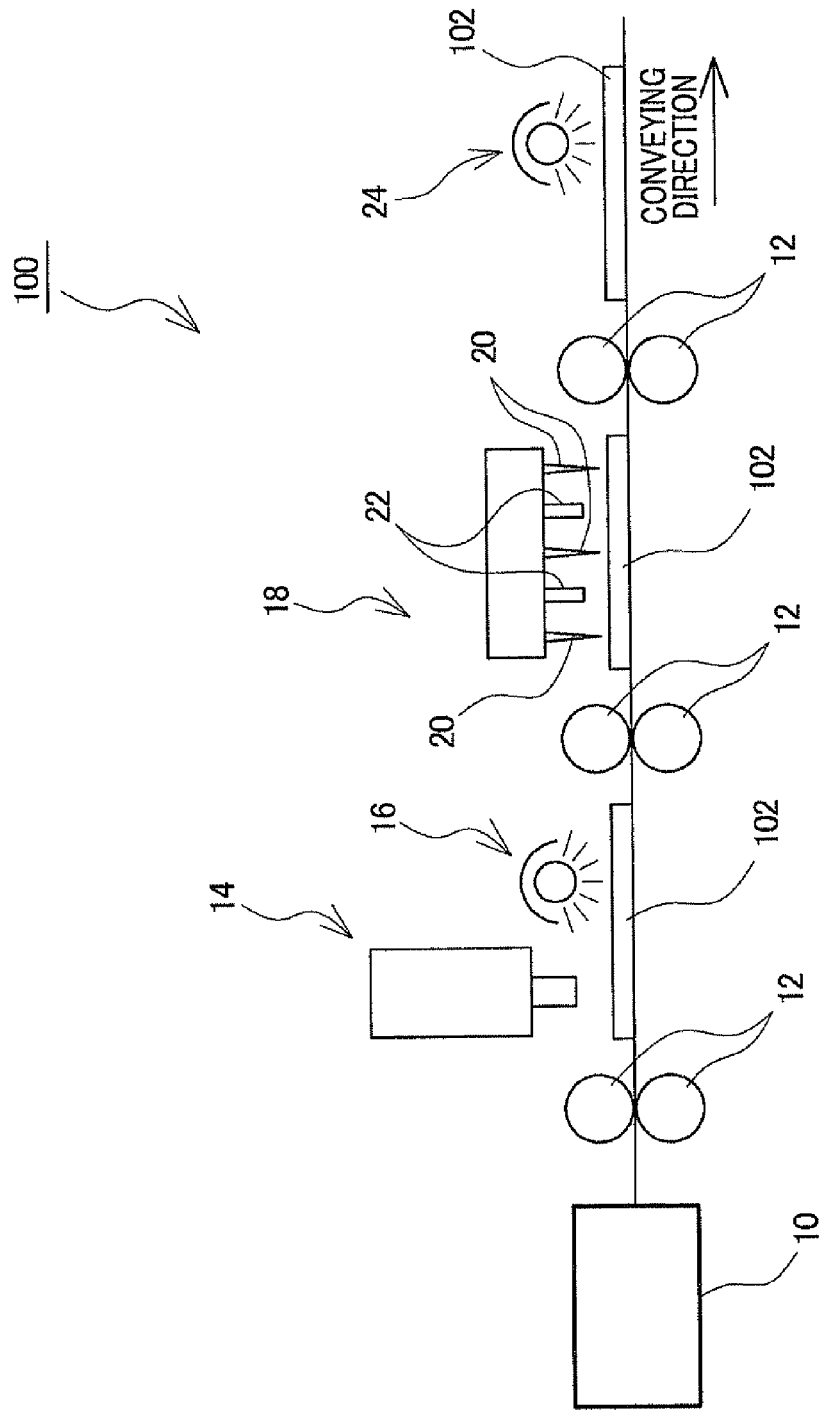
FIG. 1 is a diagram schematically illustrating the configuration of a lens manufacturing apparatus according to an exemplary embodiment of the invention.
Figure 2:
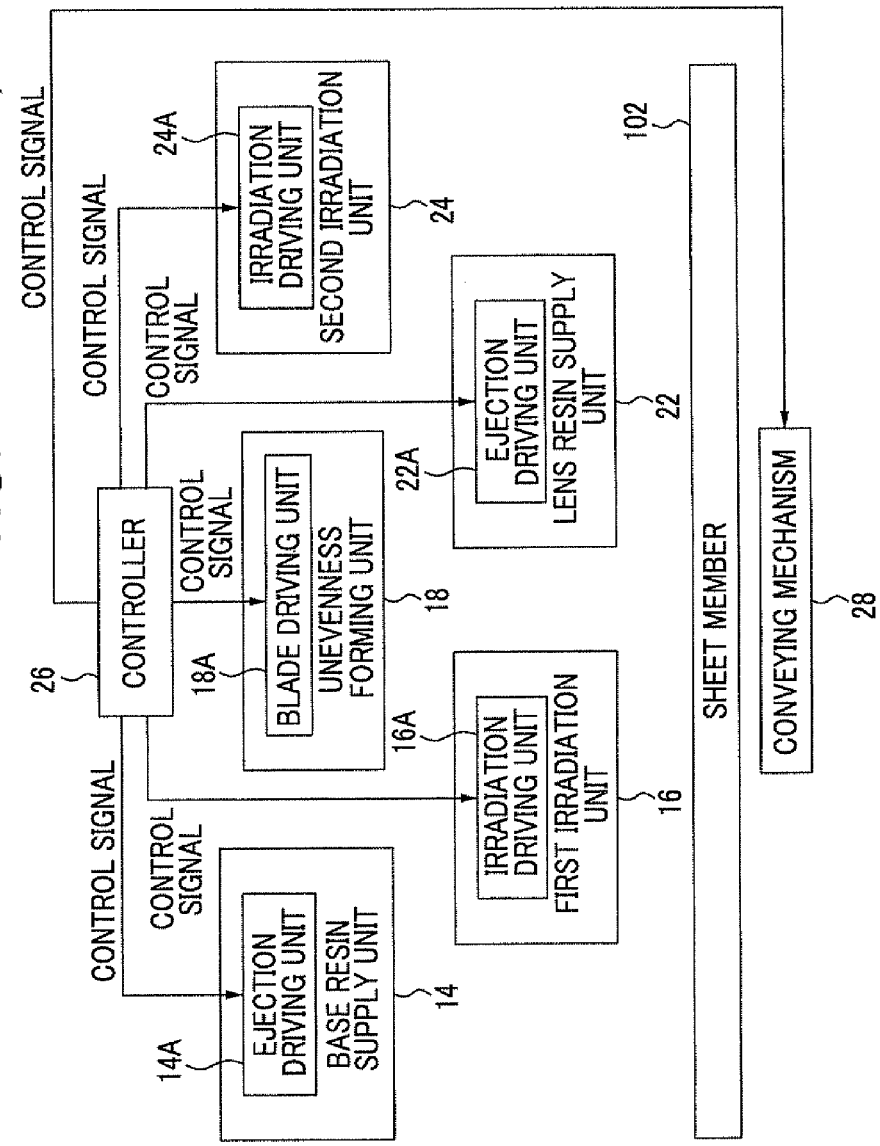
FIG. 2 is a block diagram illustrating the functional configuration of the lens manufacturing apparatus according to the exemplary embodiment.

FIG. 1 is a diagram schematically illustrating a lens manufacturing apparatus according to this exemplary embodiment of the invention. FIG. 2 is a block diagram illustrating a functional configuration of the lens manufacturing apparatus according to this exemplary embodiment.

In FIG. 1, the lens manufacturing apparatus 100 includes a sheet supply unit 10, conveying rollers 12, a base resin supply unit 14, a first irradiation unit 16, an unevenness forming unit 18, blades 20, a lens resin supply unit 22, and a second irradiation unit 24. In this exemplary embodiment, the sheet supply unit 10, the base resin supply unit 14, the first irradiation unit 16, the unevenness forming unit 18, and the second irradiation unit 24 are arranged at predetermined positions in this order along the conveying direction indicated by an arrow from the upstream side. The base resin supply unit 14 and the lens resin supply unit 22 are configured to eject resins from appropriate nozzles.

The sheet supply unit 10 conveys a sheet member 102 such as a printing sheet in the direction of the arrow in the drawing in cooperation with the conveying rollers 12. The system conveying the sheet member 102 may include a conveyer belt in addition to the conveying rollers 12. The system may further include a rotating table of the sheet member 102 to be described later.

The base resin supply unit 14 supplies a liquid-phase base resin (photo-curable resin) to the surface of the conveyed sheet member 102. The base resin supply unit 14 loads the base resin onto the surface of the sheet member 102 in a flat shape. Onto what area of the sheet member 102 the base resin is loaded is controlled by a controller 26 to be described later.

The first irradiation unit 16 irradiates the base resin on the surface of the sheet member 102 with curing light such as ultraviolet rays and cures the base resin to form a resin base. In FIG. 1, the resin base is not shown.

The unevenness forming unit 18 includes the blades 20 and the lens resin supply units 22 and makes cuts in the surface of the resin base by the use of the blades 20 of the unevenness forming unit 18 to form convex and concave portions while reciprocating in a direction different from the conveying direction of the sheet member 102, for example, the direction substantially perpendicular to the conveying direction. The convex and concave portions include groove-like concave portions formed in the moving direction of the blades 20 by the blades 20 and mountain-like convex portions formed in the moving direction of the blades 20 on both sides of the concave portions as described later. The convex portions serve as partition walls when supplying the lens resin. The lens resin supply unit 22 supplies the lens resin to the surface of the resin base in which the concave portions are not formed between the convex portions and the concave portions in the formation direction of the convex portions. The flow of the lens resin is suppressed by the convex portions on both sides thereof and the surface swells due to the surface tension thereof to form semi-cylindrical lenses extending in the formation direction of the convex portions.

The second irradiation unit 24 irradiates the lens resin having the lens shape with curing light such as ultraviolet rays and cures the lens resin to form lenses.

As shown in FIG. 2, the base resin supply unit 14 includes an ejection driving unit 14A ejecting a liquid resin with an application of a voltage or the like. The first irradiation unit 16 includes an irradiation driving unit 16A emitting the curing light with the turning-on of a light source or the like. The unevenness forming unit 18 includes a blade driving unit 18A driving the cutting blades 20 to form the convex and concave portions. The blade driving unit 18A causes plural blades 20 to move in the processing direction (toward the resin base)

and to reciprocate in a direction different from the conveying direction of the sheet member 102. The lens resin supply unit 22 includes an ejection driving unit 22A ejecting a liquid lens resin with an application of a voltage or the like. The second irradiation unit 24 includes an irradiation driving unit 24A emitting curing light with the turning-on of a light source or the like.

The ejection driving unit 14A, the irradiation driving unit 16A, the blade driving unit 18A, the ejection driving unit 22A, the irradiation driving unit 24A, and the conveying mechanism 28 are electrically connected to the controller 26. The conveying mechanism 28 includes the sheet supply unit 10 and the conveying rollers 12 described with reference to FIG. 1 and conveys the sheet member 102.

The controller 26 is constructed by a computer including a CPU, a ROM, a RAM, a nonvolatile memory, and an I/O, controlling the overall apparatus and performing various calculating operations. The ejection driving unit 14A, the irradiation driving unit 16A, the blade driving unit 18A, the ejection driving unit 22A, the irradiation driving unit 24A, and the conveying mechanism 28 operate to form a resin base on the overall surface of the sheet member 102 or an instructed partial surface thereof and to form lenses on the basis of a control signal from the controller 26.

Figure 3:
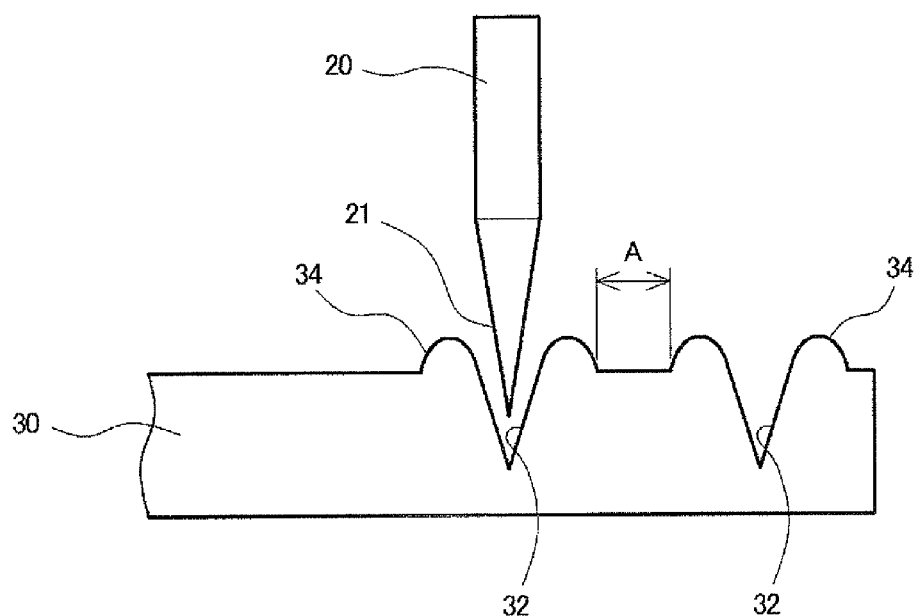
FIG. 3 is a partial cross-sectional view illustrating an example of concave and convex portions formed in a resin base.

FIG. 3 is a partial cross-sectional view of the convex and concave portions formed on the resin base. FIG. 3 shows a cross-section obtained by sectioning the resin base 30 formed on the surface of the sheet member 102 along the direction perpendicular to the reciprocating direction of the unevenness forming unit 18.

As shown in FIG. 3, when the surface of the resin base 30 is cut by blade edges 21 of the cutting blades 20, the concave portions 32 are formed. When the concave portions 32 are formed, the convex portions 34 protruding from the surface of the resin base 30 are formed on both sides of the concave portions 32. The unevenness forming unit 18 makes cuts by the use of the blades 20 to form plural convex portions 34 while repeatedly reciprocating in a direction different from (for example, a direction perpendicular to) the conveying direction of the sheet member 102 (the resin base 30) indicated by an arrow. As a result, since an area A in which the concave portions 32 are not formed is formed between two neighboring convex portions 34 as shown in FIG. 3, the lens resin supply unit 22 supplies the lens resin to the area. The flow of the lens resin to the concave portions 32 is suppressed by the two neighboring convex portions 34 and semi-cylindrical lenses extending in the depth direction of the drawing surface (that is, having anisotropy) are formed.

In the example shown in FIG. 3, only one blade 20 is shown, but the number of blades is not limited to one and an appropriate number of blades 20 can be provided.

The height of the convex portions 34 is set depending on the radius of curvature and the width (the length in the conveying direction shown in FIG. 3) of a lens to be formed. When the width of a lens is constant and the decrease of the radius of curvature of the lens is intended, the height of the convex portions 34 has only to be decreased. As the height of the convex portions 34 decreases, the capacity between two neighboring convex portions 34 decreases. Accordingly, a lens with a desired radius of curvature is formed even with a small amount of liquid lens resin supplied. When the height of the convex portions 34 (that is, the capacity between the neighboring convex portions 34) is constant but the amount of liquid lens resin supplied increases, the radius of curvature of a lens decreases.

In FIGS. 4A, 4B, and 4C, a lens forming step is shown. In FIG. 4A, the unevenness forming unit 18 includes three blades 20a, 20b, and 20c and three lens resin supply units 22a, 22b, and 22c. Here, the number of them is not limited to three, but can be appropriately determined depending on the movement velocity of the unevenness forming unit 18, the conveyance velocity of the sheet member 102 (the resin base 30), and the pitch of the blades 20.

Three blades 20a, 20b, and 20c and three lens resin supply units 22a, 22b, and 22c are supported at appropriate pitches by the unevenness forming unit 18. When making cuts in the surface of the resin base 30, the unevenness forming unit 18 goes down to the surface of the resin base 30 to the downside in the drawing and reciprocates in the direction different from the conveying direction of the sheet member 102, for example, the direction substantially perpendicular to the conveying direction. With this reciprocation, the unevenness forming unit 18 makes cuts while scanning the surface of the resin base 30.

FIG. 4C shows the surface of the unevenness forming unit 18 on which the blades 20a, 20b, and 20c and the lens resin supply units 22a, 22b, and 22c are formed (a view seen from the downside in the drawing). The operation direction (cutting operation direction) when making cuts in the surface of the resin base 30 is indicated by an arrow. As shown in FIG. 4C, the blade edges of the blades 20a, 20b, and 20c have a linear shape and are supported in a direction forming an angle $\theta$ about the cutting operation direction. The angle $\theta$ is an angle formed by the direction of a combined vector of the movement velocity (a vector parallel to the cutting operation direction) of the unevenness forming unit 18 and the inverse velocity (vector) of the conveyance velocity of the sheet member 102 and the cutting operation direction. The direction of the blade edges of the blades 20a, 20b, and 20c can determine the direction of the cuts made in the resin base 30 by controlling the relationship between the direction of the cuts made in the resin base 30, the movement velocity of the unevenness forming unit 18, and the conveyance velocity of the sheet member 102. The lens resin supply units 22a, 22b, and 22c are disposed downstream from the blades 20a, 20b, and 20c in the cutting operation direction.

In FIG. 4C, the blade edges of the blades 20a, 20b, and 20c are formed in a linear (flat) shape, but are not limited to this shape and the blade edges may have a needle shape.

Referring to FIG. 4A again, the resin base 30 is formed on the surface of the sheet member 102 as described with reference to FIG. 1 and the sheet member 102 is conveyed in the arrow direction in the drawing. The thickness relationship between the sheet member 102 and the resin base 30 shown in FIG. 4A is intended for explanation, but does not represent the actual thickness relationship. This is true of the below description. The unevenness forming unit 18 goes down to the surface of the resin base 30 at a scanning start position while conveying the sheet member 102 and presses the blade edges of the blades 20a, 20b, and 20c to the surface of the resin base 30 (inserts the blades into the resin base 30) to cut the surface of resin base 30 while moving in the cutting operation direction. The moving distance of the unevenness forming unit 18 is a distance with which cuts corresponding to the length of the lenses can be formed such as the length of a parallax image (which is an image to be stereoscopically viewed and which is obtained by cutting two or more images in a strip shape and alternately arranging the cut images to form a single image) in the cutting operation direction. While moving, the liquid lens resin supplied from an appropriate resin supply unit is ejected and supplied to the areas in which the concave portions 32 are not formed between the convex portions 34 from the lens resin supply units 22a, 22b, and 22c. The supplied lens resin swells in a semi-cylindrical lens shape.

Information on whether the parallax image is printed in what area on the sheet member 102 and information on to what direction the length direction of the strip-like image pieces included in the parallax image is parallel are acquired by the controller 26 from print data input to a printing apparatus. The controller 26 determines the scanning start position and the moving distance of the unevenness forming unit 18 on the basis of the acquired position of the parallax image. When the controller 26 controls the base resin supply unit 14 and the first irradiation unit 16 to form the resin base 30 only in the area in which the parallax image is printed, the control of determining the moving distance of the unevenness forming unit 18 on the basis of the position of the parallax image may not be performed. In this case, the moving distance of the unevenness forming unit 18 has only to be set to be equal to or greater than the length in the direction perpendicular to the conveying direction of the sheet member 102.

The unevenness forming unit 18 goes up from the surface of the resin base 30 to the upside in FIG. 4A after moving by the above-mentioned distance, separates the blade edges of the blades 20a, 20b, and 20c from the surface of the resin base 30, maintains the blade edges at positions not contacting with the surface of the resin base 30, causes the blade edges to move in the inverse direction of the cutting operation direction, and returns to the scanning start position, whereby one cycle of reciprocation is ended. As shown in FIG. 4C, the lens resin supply units 22a, 22b, and 22c are disposed downstream from the blades 20a, 20b, and 20c in the cutting operation direction. Accordingly, the supply of the lens resin is not ended when the unevenness forming unit 18 ends the movement of the moving distance. Therefore, it is preferable that the unevenness forming unit 18 move again in the cutting operation direction until the supply of the lens resin from the lens resin supply units 22a, 22b, and 22c is ended in a state where the blade edges of the blades 20a, 20b, and 20c do not come in contact with the surface of the resin base 30, and then return in the inverse direction.

As shown in FIG. 4A, when the unevenness forming unit 18 performs the first moving operation of making cuts in the surface of the resin base 30, two convex portions 34 are not formed (only one convex portion is formed so as not to form an area between the convex portions) on the surface of the resin base 30 opposed to the nozzle of the lens resin supply unit 22c located at an end of the unevenness forming unit 18. Accordingly, even when the lens resin is supplied in this state, the shape of a lens cannot be appropriately formed. Therefore, it is preferable that the supply of the lens resin from the nozzle of the lens resin supply unit 22c located at an end of the unevenness forming unit 18 be stopped in the first moving operation. This control is performed by the ejection driving unit 22A.

Thereafter, as shown in FIG. 4B, the unevenness forming unit 18 performs the formation of the cuts and the supply of the lens resin by only a predetermined length on the resin base 30 while repeatedly reciprocating, and the second irradiation unit 24 irradiates the resultant with curing light to cure the lens resin and to form lenses. These lenses are formed to extend in the length direction of the strip-like image pieces included in the parallax image.

In the examples shown in FIGS. 4A, 4B, and 4C, in a certain reciprocation (referred to as a previous reciprocation) and a next reciprocation (referred to as a subsequent reciprocation) of the unevenness forming unit 18, the blade 20c forms the concave portion 32 in the subsequent reciprocation at a position different from the concave portion 32 formed by the blade 20a in the previous reciprocation, that is, a position separated from the concave portion 32 formed by the blade 20a by the same distance of the pitch of the blades 20a, 20b, and 20c. Accordingly, as described above, the control of stopping the supply of the lens resin from the lens resin supply unit 22c needs to be performed in the first moving operation. On the contrary, when the position of the unevenness forming unit 18 is controlled in the subsequent reciprocation so as to overlap the blade 20c with the concave portion 32 formed by the blade 20a in the previous reciprocation, it is not necessary to provide the lens resin supply unit 22c and to perform the control of stopping the supply of the lens resin from the lens resin supply unit 22c in the first moving operation. In this embodiment, any configuration can be employed.

In the above-mentioned example, the blades 20a, 20b, and 20c are incorporated into the unevenness forming unit 18, but the blades 20a, 20b, and 20c and the lens resin supply units 22a, 22b, and 22c may not be incorporated into a body. In this case, for example, a configuration may be employed in which an unevenness forming unit 18 having the blades 20a, 20b, and 20c is disposed upstream in the conveying direction of the sheet member 102 and the lens resin supply units 22a, 22b, and 22c are disposed downstream.

It is assumed in the above-mentioned example that the surface of the resin base 30 formed on the sheet member 102 is flat, but the invention is not limited to this example. For example, various widely-known surface processes may be performed on the resin base 30 to form unevenness with an N-point average height Rz of $1$ $\mu m \leq Rz$ on the surface of the resin base 30 before making cuts therein.

Figure 5B:
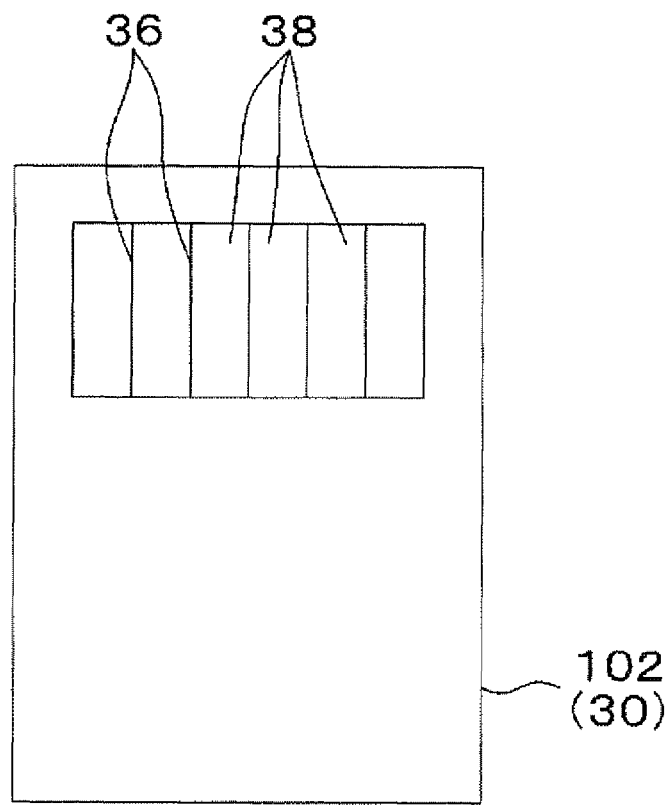
Figure 5C:
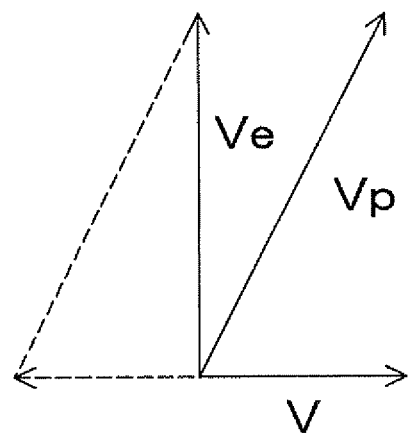

FIGS. 5A, 5B, and 5C show an example where lenses are formed on a parallax image in this exemplary embodiment. In FIG. 5A, a parallax image 36 is printed in a part on the sheet member 102 and a resin base 30 is formed on the overall surface of the sheet member 102 by the use of the base resin supply unit 14 and the first irradiation unit 16. In this example, the length direction of the strip-like image pieces included in the parallax image 36 is parallel to the direction perpendicular to the conveying direction of the sheet member 102.

In FIG. 5A, as described with reference to FIG. 1 to FIGS. 4A, 4B, and 4C, the blade edges 21 of the blades 20 of the unevenness forming unit 18 are inserted into the surface of the resin base 30 at the scanning start position S, move in the cutting operation direction P and make cuts in the surface of the resin base 30 while the sheet member 102 is being conveyed, and the lens resin is supplied at the same time. In the example shown in FIG. 5A, the cutting operation direction P is set to be inclined by a predetermined angle about the direction perpendicular to the conveying direction of the sheet member 102, as described later with reference to FIG. 5C. The lens resin is cured with the curing light from the second irradiation unit 24 not shown to form lenses 38. When one cutting operation is ended, the unevenness forming unit 18 goes in the normal direction (that is, to the upside) of the surface of the resin base 30 so that the blade edges 21 of the blades 20 are separated from the resin base 30, moves in the opposite direction of the cutting operation direction to return to the scanning start position S, and performs the next cutting operation. In this way, by causing the unevenness forming unit 18 to repeatedly perform the cutting operation, the cuts and the lenses 38 are formed in the area on the parallax image 36 on the surface of the resin base 30, as shown in FIG. 5B.

In the example shown in FIG. 5A, it is assumed that the resin base 30 is formed on the overall surface of the sheet member 102 and the controller 26 determines the scanning start position S on the basis of the information on the area of the sheet member 102 in which the parallax image 36 is printed. However, the resin base 30 may be formed on only the top surface of the parallax image 36 printed on the sheet member 102. In this case, the scanning start position S may be set to a lower-right position of the sheet member 102 in FIG. 5A.

In the example shown in FIGS. 5A and 5B, the conveyance velocity V of the sheet member 102, the movement velocity Vp of the unevenness forming unit 18, and the movement velocity Ve of the blades 20 formed in the unevenness forming unit 18 during the cutting operation satisfy the relationship shown in FIG. 5C. In FIG. 5C, the direction of the movement velocity Vp of the unevenness forming unit 18 is set to be inclined by a predetermined angle about the direction perpendicular to the conveyance velocity V so that the magnitude of the component of the movement velocity Vp of the unevenness forming unit 18 in the direction of the conveyance velocity V is equal to the magnitude of the conveyance velocity V. As a result, the direction of the movement velocity Ve (a combined vector of the movement velocity Vp of the unevenness forming unit 18 and a velocity having the same magnitude as the conveyance velocity V of the sheet member 102 and the opposite direction thereof) of the blades 20 during the cutting operation is parallel to the direction perpendicular to the conveying direction of the sheet member 102. Accordingly, the direction of the blades 20 formed in the unevenness forming unit 18 is parallel to the direction of the movement velocity Ve during the cutting operation.

In the example shown in FIGS. 5A, 5B, and 5C, when the number of cutting blades 20 formed in the unevenness forming unit 18 is defined as N, the pitch of the blades 20 is defined as W, the magnitude of the conveyance velocity of the sheet member 102 is defined V, and the time in which the unevenness forming unit 18 causes the cutting blades 20 to once reciprocate by the width Dy in the cutting operation direction of the resin base 30 is defined as T, the values are set so as to satisfy the relationship of N−1≥VT/W. That is, when the number N of cutting blades 20 is set to satisfy the above-mentioned relationship, it is possible to perform the cutting operation with the smaller number of blades than the number of blades (the number of blades 20 formed at a pitch W in the width Dx) corresponding to the width Dx in the conveying direction of the resin base 30. For example, when V=15 mm/s, T=1 s, and W=0.25 mm are set, N≥60 is obtained and it is thus possible to make cuts in the resin base 30 with at least 60 blades. On the other hand, when the resin base 30 is formed over the width 210 mm in the transverse direction of an A4 sheet and the blades 20 are formed at the pitch of W=0.25 mm, the number of blades 20 corresponding to the width in the transverse direction of the A4 sheet is 840 which is much greater than that in this exemplary embodiment.

Figure 6A:
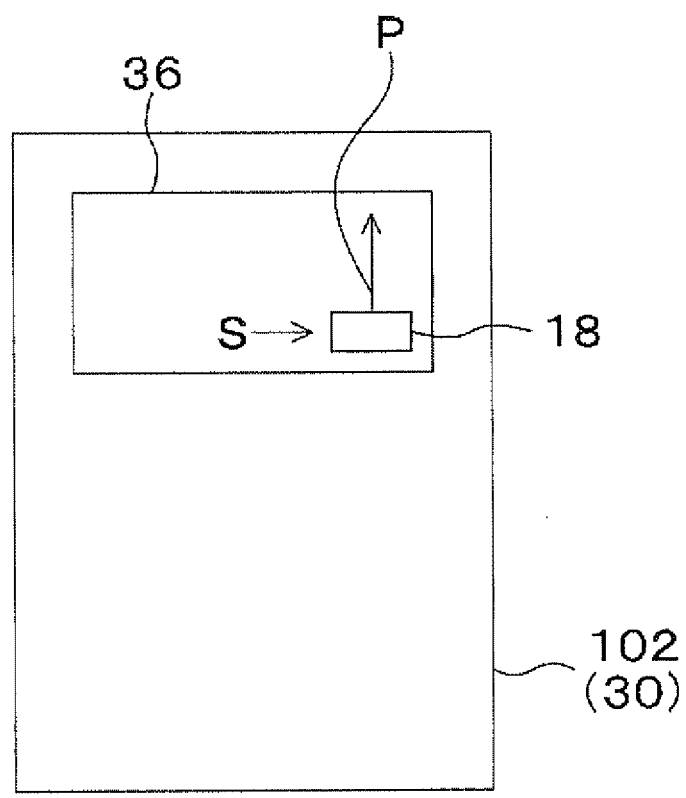
FIGS. 6A, 6B, and 6C are diagrams illustrating another example where lenses are formed on parallax images according to the exemplary embodiment.
Figure 6B:
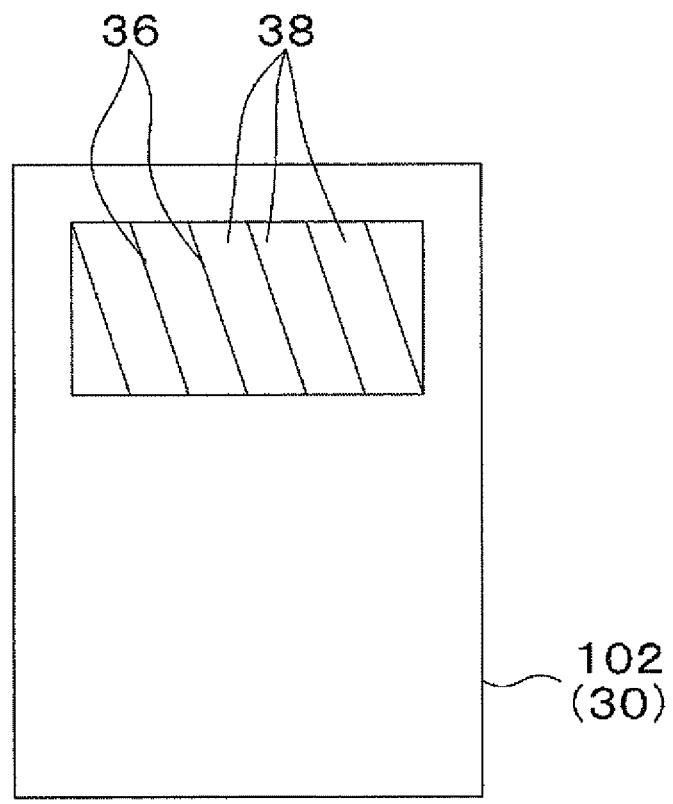
Figure 6C:
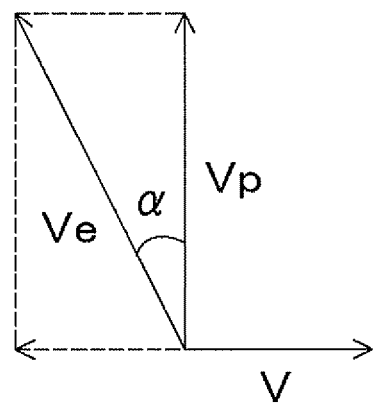

FIGS. 6A, 6B, and 6C show another example where lenses are formed on a parallax image in this exemplary embodiment, and the same elements as shown in FIGS. 5A, 5B, and 5C are referenced by the same reference numerals. In this example, the length direction of the strip-like image pieces included in the parallax image 36 is clockwise inclined by an angle α about the direction perpendicular to the conveying direction of the sheet member 102.

In FIG. 6A, as described with reference to FIG. 5A, by causing the unevenness forming unit 18 to repeatedly perform the cutting operation with the scanning start position S as a start point, the cuts and the lenses 38 are formed in the area on the parallax image 36 on the surface of the resin base 30, as shown in FIG. 6B.

In the examples shown in FIGS. 6A and 6B, the conveyance velocity V of the sheet member 102, the movement velocity Vp of the unevenness forming unit 18, and the movement velocity Ve of the blades 20 formed in the unevenness forming unit 18 during the cutting operation satisfy the relationship shown in FIG. 6C. In FIG. 6C, the direction of the movement velocity Vp of the unevenness forming unit 18 is perpendicular to the direction of the conveyance velocity V. As a result, the direction of the movement velocity Ve (a combined vector of the movement velocity Vp of the unevenness forming unit 18 and a velocity having the same magnitude as the conveyance velocity V of the sheet member 102 and the opposite direction thereof) of the blades 20 during the cutting operation is counterclockwise inclined by a predetermined angle α about the direction perpendicular to the conveying direction of the sheet member 102. Accordingly, the direction of the blades 20 formed in the unevenness forming unit 18 is parallel to the direction of the movement velocity Ve during the cutting operation and is counterclockwise inclined by the predetermined angle α about the direction perpendicular to the conveying direction of the sheet member 102.

In the example shown in FIG. 6C, the direction of the movement velocity Vp of the unevenness forming unit 18 is parallel to the direction perpendicular to the conveying direction (the direction of the conveyance velocity V) of the sheet member 102, but the invention is not limited to this example and an appropriate direction different from the conveying direction of the sheet member 102 can be set as the direction of the movement velocity. Accordingly, the direction and the magnitude of the movement velocity Vp of the unevenness forming unit 18 and the magnitude of the conveyance velocity V of the sheet member 102 can be appropriately adjusted and the direction of the movement velocity Ve of the blades 20 during the cutting operation, that is, the direction of the blades 20, can be variously determined, so that the length direction of the lenses can be matched with the length direction of the strip-like image pieces included in the parallax image 36.

For example, when it is assumed that the magnitude of the movement velocity Vp of the unevenness forming unit 18 is 400 mm/s and the magnitude of the conveyance velocity V of the sheet member 102 is 15 mm/s and when the direction of the movement velocity Vp of the unevenness forming unit 18 is perpendicular to the direction of the conveyance velocity V of the sheet member 102, the moving direction of the blades during the cutting operation is inclined by about α=atan (15/400)≈2 about the direction (the direction perpendicular to the direction of the conveyance velocity V of the sheet member 102) of the movement velocity Vp of the unevenness forming unit 18.

In this way, when the moving direction of the blades 20 during the cutting operation is inclined by a predetermined angle α about the direction perpendicular to the direction of the conveyance velocity V of the sheet member 102, the width of the cuts formed in the surface of the resin base 30 and the width of the lenses 38 formed can be set to be smaller than the pitch of the cutting blades 20 formed in the unevenness forming unit 18.

Figure 7:
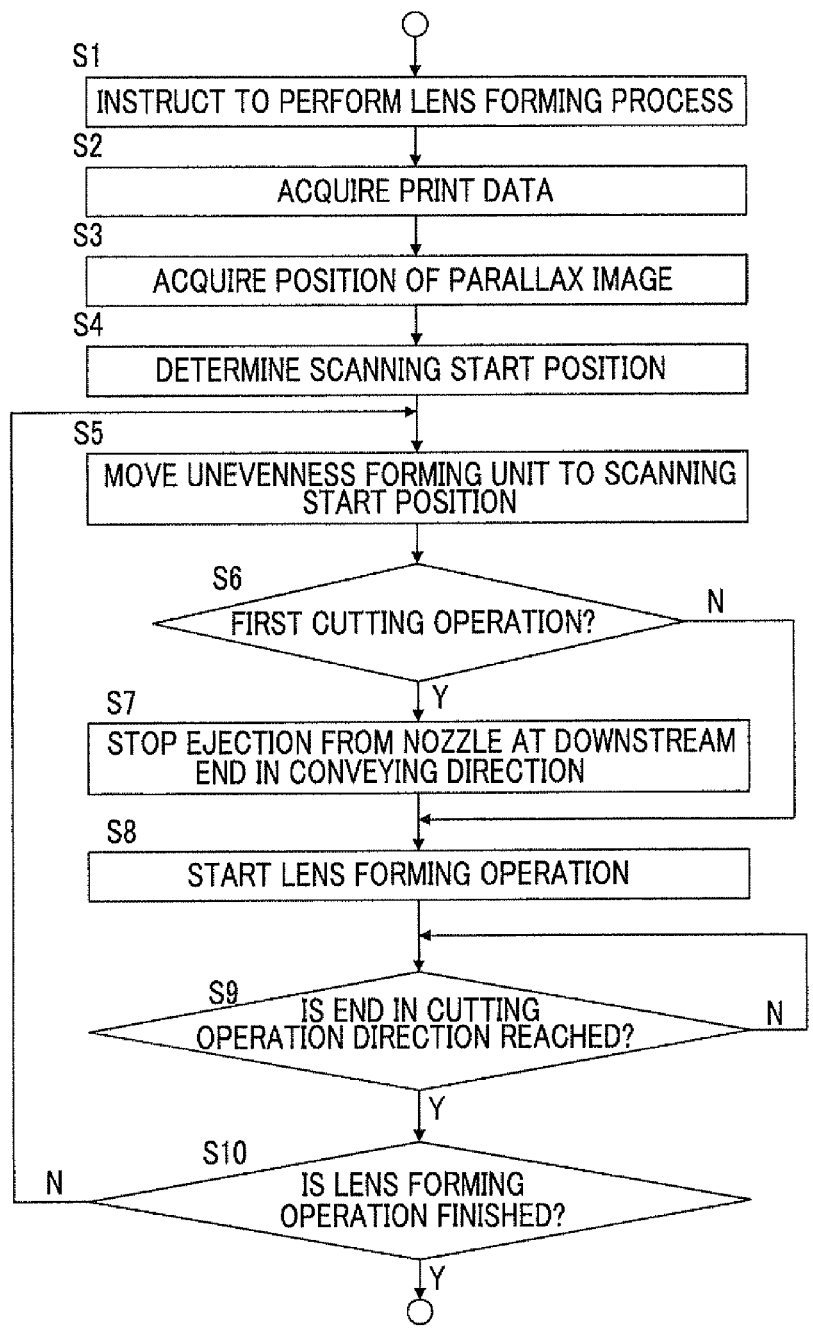
FIG. 7 is a flow diagram illustrating the flow of controlling a lens forming operation by the use of a controller.

FIG. 7 is a flow diagram illustrating the control flow of the lens forming operation using the controller 26. In FIG. 7, it is assumed that the sheet member 102 having a resin base 30 formed thereon in advance is conveyed by the conveying mechanism 28.

In FIG. 7, when an instruction of performing a lens forming process on the sheet member 102 is given from a printing apparatus or the like (S1), the controller 26 acquires print data input to the printing apparatus (S2) and acquires the position (formation area) of the parallax image 36 on the sheet member 102 from the print data (S3). The position of the parallax image 36 may be input by a user through the use of a user interface using a keyboard, a pointing device, or the like or may be transmitted from an external computer via a network again. The controller 26 stores the print data or information on the position of the parallax image 36 in a storage device and reads and uses the information when performing the processes of S4 and subsequent steps.

Then, the controller 26 detects the area in which the parallax image 36 is printed on the sheet member 102 and determines the scanning start position of the unevenness forming unit 18 (S4). A position on the lower-right side of the parallax image 36, for example, in FIG. 5A can be suitably used as the scanning start position. Here, when the resin base 30 is formed on only the top surface of the parallax image 36, for example, a position on the lower-right side of the sheet member 102 in FIG. 5A may be set as the scanning start position. The controller 26 causes the unevenness forming unit 18 to move to the scanning start position determined in S4 (S5).

The controller 26 determines whether the operation is a first cutting operation after the instruction of performing the lens forming process is given (S6), before starting the cutting operation using the unevenness forming unit 18.

When it is determined in S6 that the operation is a first cutting operation after the instruction of performing the lens forming process is given, the controller 26 controls the ejection driving unit 22A to stop the ejection of the lens resin from the nozzle (for example, the nozzle of the lens resin supply unit 22c in FIG. 4A) at the downstream end in the conveying direction of the sheet member 102 out of the nozzles of the lens resin supply units 22 formed in the unevenness forming unit 18 (S7).

After performing the process of step S7 or when it is determined in S6 that the operation is not a first cutting operation after the instruction of performing the lens forming process is given, the controller 26 causes the blade driving unit 18A and the ejection driving unit 22A to start the lens forming operation and to perform the formation of cuts in and the supply of the lens resin to the surface of the resin base 30 while causing the unevenness forming unit 18 to move in the cutting operation direction (S8). In this case, the cutting operation direction is set to the length direction of the strip-like image pieces included in the parallax image 36.

The blade driving unit 18A monitors whether the blade driving unit 18A reaches an endpoint in the cutting operation direction after the lens forming operation is started (S9). The end point in the cutting operation direction is set to the end of the parallax image 36 in the cutting operation direction or the like and the unevenness forming unit 18 moves by the distance with which the cuts corresponding to the length of the lenses can be formed. As described above, the end point is preferably determined in consideration of the arrangement of the lens resin supply units 22.

The controller 26 monitors whether lenses are formed in the previously-acquired formation area of the parallax image 36 (S10). When the lenses are formed in the overall formation area of the parallax image 36, the lens forming operation is ended. On the other hand, when the lens forming operation is not ended, the processes of S5 and subsequent steps are repeated.

In this way, the lens forming process on the formation area of the parallax image 36 is performed while causing the unevenness forming unit 18 to reciprocate.

Figure 8A:
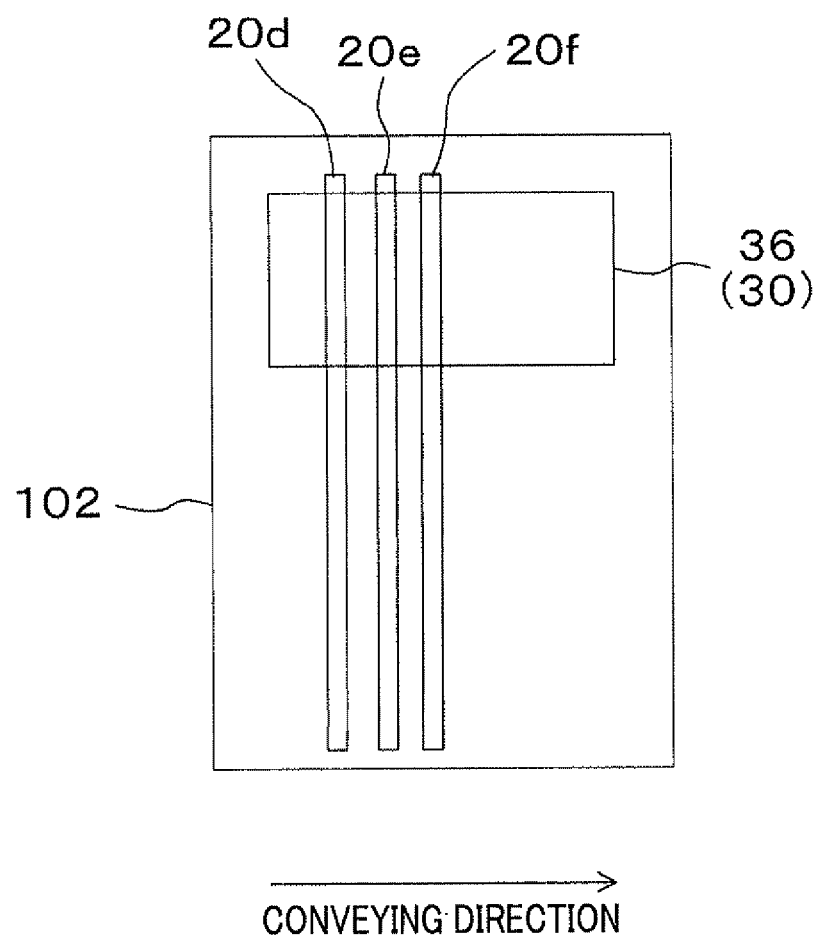
FIGS. 8A and 8B are diagrams illustrating still another example where lenses are formed on parallax images according to the exemplary embodiment.
Figure 8B:
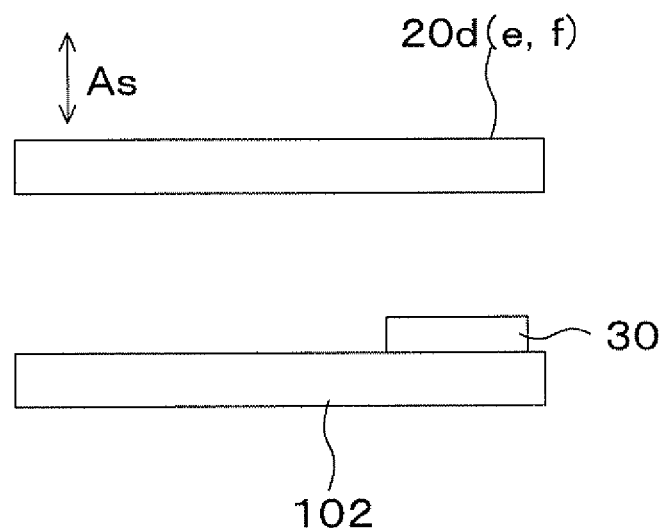

FIGS. 8A and 8B show another example where lenses are formed on a parallax image in this exemplary embodiment. As shown in FIGS. 8A and 8B, the parallax image 36 is printed in a part on the sheet member 102 and a resin base 30 is formed on only the parallax image 36.

In this exemplary embodiment, linear blades 20d, 20e, and 20f having a length equal to or larger than the length of the sheet member 102 in the direction perpendicular to the conveying direction of the sheet member 102 are formed in the unevenness forming unit 18. Unlike the above-mentioned exemplary embodiment, the unevenness forming unit 18 makes cuts in the surface of the resin base 30 while reciprocating in the normal direction of the surface of the resin base 30 as indicated by an arrow As in FIG. 8B, instead of reciprocating along the surface of the resin base 30. In this case, since the resin base 30 is formed only on the parallax image 36 by the base resin supply unit 14 and the first irradiation unit 16, the cuts are formed only in the resin base 30 and the lenses 38 are formed only on the parallax image 36, regardless of the length of the blades 20d, 20e, and 20f.

In the example shown in FIGS. 8A and 8B, three cutting blades are shown (20d, 20e, and 20f), but the number of blades is not limited three. The number of blades can be appropriately determined depending on the period in which the cutting blades reciprocate in the normal direction of the surface of the resin base 30, the conveyance velocity of the sheet member 102 (resin base 30), the blade pitch, and the like.

FIG. 9 is a block diagram illustrating another functional configuration of the lens manufacturing apparatus according to this exemplary embodiment. FIG. 9 is characterized in that a rotating table 40 rotating the sheet member 102 and controlling the direction of the cuts using the cutting blades is disposed in the conveying mechanism 28. The rotating table 40 is controlled along with the conveying mechanism 28 by the controller 26 and rotates while moving in the conveying direction with the sheet member 102 loaded thereon.

The controller 26 determines in what area on the sheet member 102 lenses should be formed in which direction on the basis of the position of the parallax image acquired from the print data input to the printing apparatus or instruction information input by a user through the use of a user interface or the like.

Figure 10A:
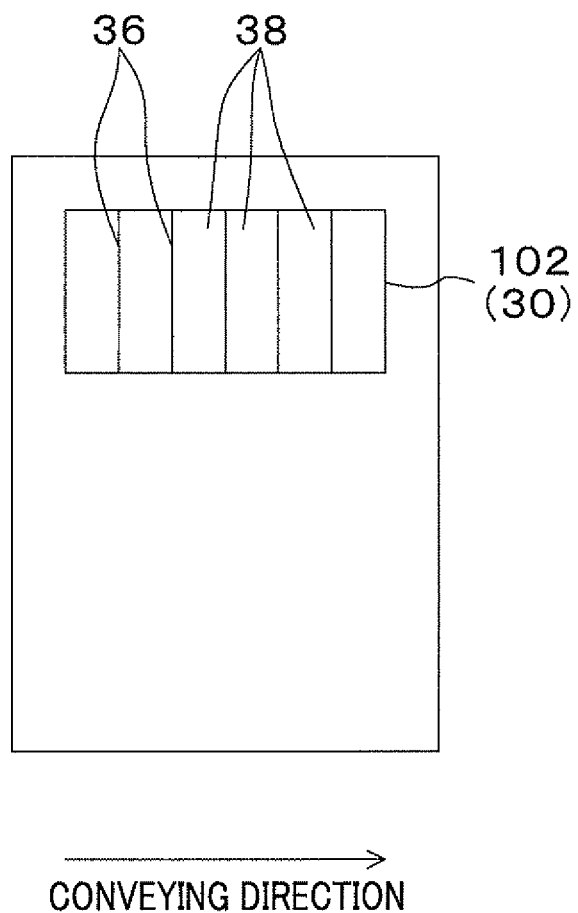
FIGS. 10A and 10B are diagrams illustrating an example where a lens forming direction is changed by the use of a rotating table.
Figure 10B:
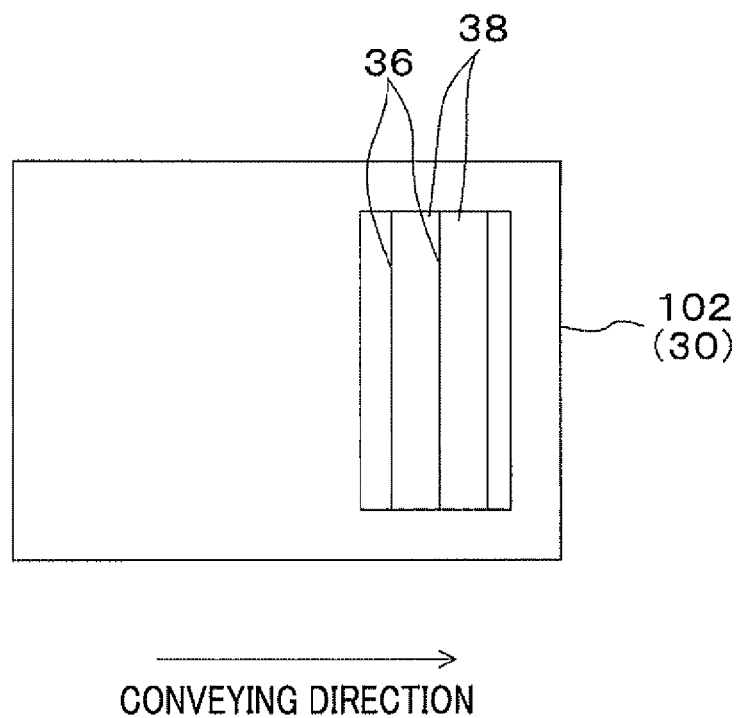

FIGS. 10A and 10B show an example where the formation direction of the lenses 38 is changed through the use of the rotating table 40. In FIGS. 10A and 10B, the conveying direction is indicated by an arrow and the unevenness forming unit 18 not shown makes cuts in the resin base 30 from the downside to the upside in the drawing in the direction substantially perpendicular to the conveying direction of the sheet member 102 loaded on the rotating table 40. In this case, the reciprocating direction of the unevenness forming unit 18 is controlled so that the cuts are formed in the direction perpendicular to the conveying direction of the sheet member 102.

In FIG. 10A, in the resin base 30 on the parallax image 36 detected by the controller 26, the cuts and the lenses 38 are formed in the longitudinal direction of the vertically-long sheet member 102. In this case, the controller 26 detects the area of the parallax image 36 included in the print data or the area instructed by the instruction information input by a user and performs a control to form the lenses 38 in the detected area so as to be parallel to the length direction of the strip-like image pieces included in the parallax image 36. In order to perform this control, the controller 26 calculates to what position the area of the parallax image 36 included in the print data should move with the rotation of the rotating table 40.

On the other hand, when an instruction of rotating the state shown in FIG. 10A clockwise by 90 degrees and then forming the lenses 38 is included in the print data or the instruction information input by a user, that is, when the length direction of the strip-like image pieces included in the parallax image 36 rotates clockwise by 90 degrees, the rotating table 40 rotates clockwise by 90 degrees with the sheet member 102 loaded thereon and the unevenness forming unit 18 performs the cutting and the formation of lenses, as shown in FIG. 10B. The direction of the formed lenses 38 rotates by 90 degrees from the state shown in FIG. 10A and is parallel to the transverse direction of the vertically-long sheet member 102. In this case, the controller 26 detects the area of the parallax image 36 included in the print data or the area instructed by the instruction information input by the user and performs a control of forming the lenses 38 in the detected area. The controller 26 calculates to what position the area of the parallax image 36 included in the print data should move with the rotation of the rotating table 40.

The formation direction of the lenses 38 is not limited to the examples shown in FIGS. 10A and 10B, but may be set to any direction matched with the length direction of the strip-like image pieces included in the parallax image 36. In order to control the direction, the controller 26 calculates the formation direction of the lenses 38 on the basis of the movement velocity of the unevenness forming unit 18, the conveying direction of the sheet member 102, and the rotating angle of the rotating table 40.

Figure 11:
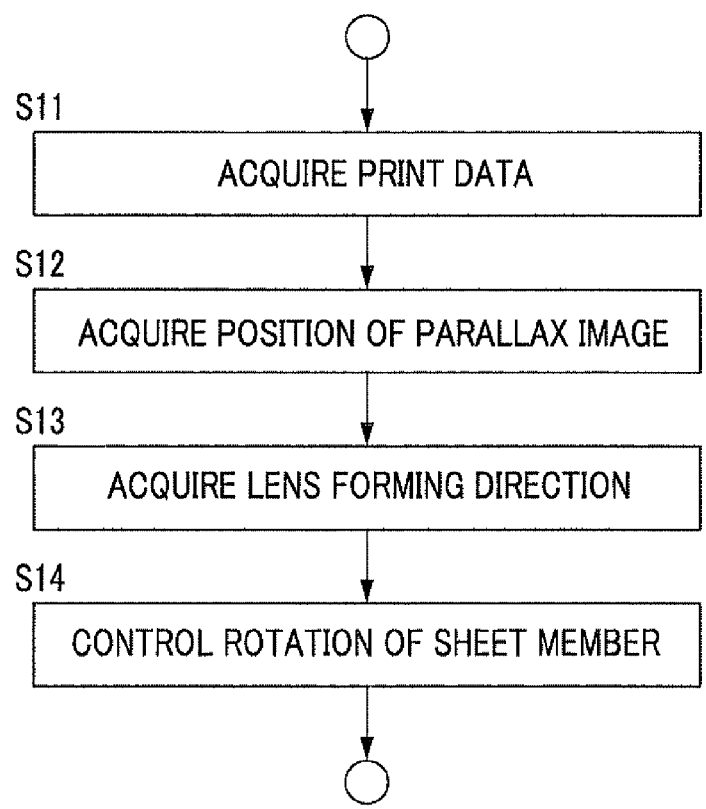
FIG. 11 is a flow diagram illustrating the operation control of the rotating table.

FIG. 11 is a flow diagram illustrating the flow of an operation control of the rotating table 40. In FIG. 11, when an instruction of performing a lens forming process on the sheet member 102 is given from a printing apparatus or the like, the controller 26 acquires print data input to the printing apparatus (S11) and acquires the position (formation area) of the parallax image on the sheet member 102 from the print data (S12). The position of the parallax image may be acquired from information input by a user through the use of a user interface.

The controller 26 acquires the formation direction of the lenses 38 to be formed on the sheet member 102 on the basis of the print data or the information input by a user (S13). The formation direction is the length direction of the strip-like image pieces included in the parallax image 36. So as to embody the formation direction of the lenses 38 acquired in S13, the controller 26 calculates an appropriate rotating angle of the rotating table 40 from the movement velocity of the unevenness forming unit 18 and the conveying direction of the sheet member 102 and performs the rotation control of the sheet member 102 on the basis of the rotating angle (S14).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A lens manufacturing apparatus comprising:
    a conveying unit that conveys a workpiece comprising a sheet member and a resin base on the sheet member;
    an unevenness forming unit that moves one or a plurality of cutting blades in a direction different from the conveying direction of the workpiece and that makes a cut in a surface of the resin base, wherein the resin base, as a result of the cut by the unevenness forming unit, includes concave portions, convex portions and areas, each of the areas being disposed between two neighboring convex portions of the convex portions, the convex portions not being formed on the areas;
    a resin supply unit that has nozzles supplying a lens resin to the areas whereby the supplied resin forms a convex shape; and
    a resin curing unit that cures the supplied lens resin,
    wherein the unevenness forming unit and the resin supply unit are formed with a same working head.

2. The lens manufacturing apparatus according to claim 1, wherein the following expression is satisfied:

$$N-1 \geq VT/W,$$

where N represents a number of the plurality of cutting blades, W represents the pitch (mm) of the cutting blades, V represents a conveyance velocity (mm/s) of the conveying unit, and T represents the time (s) in which the unevenness forming unit causes the cutting blades to once reciprocate over the width of the resin base.

3. The lens manufacturing apparatus according to claim 1, wherein a movement velocity of the cutting blade and a conveyance velocity of the workpiece are controlled so that the direction of the cutting blade is substantially perpendicular to the conveying direction of the workpiece.

4. The lens manufacturing apparatus according to claim 1, wherein the conveying unit includes a workpiece rotating unit that rotates the workpiece to control the direction of the cut made with the cutting blade.

5. The lens manufacturing apparatus according to claim 1, wherein the resin supply unit has an ejection driving unit that controls the supply of the lens resin, the ejection driving unit stops the supply of the lens resin from the nozzles located outside the areas between the convex portions formed on the surface of the resin base out of the nozzles.

6. The lens manufacturing apparatus according to claim 1, wherein the unevenness forming unit includes a plurality of linear blades.

7. The lens manufacturing apparatus according to claim 1, wherein the unevenness forming unit includes a plurality of needle-like blades.

8. The lens manufacturing apparatus according to claim 1, wherein the resin curing unit is an ultraviolet irradiation device.

9. The lens manufacturing apparatus according to claim 1, further comprising:
    a resin base forming unit that forms the resin base.

10. The lens manufacturing apparatus according to claim 9, wherein the resin base forming unit includes a base resin supply unit and a base resin curing unit.

11. The lens manufacturing apparatus according to claim 1, wherein the unevenness forming unit moves the one or a plurality of cutting blades in a direction substantially perpendicular to or inclined by a predetermined angle about a direction perpendicular to the conveying direction of the workpiece.

12. The lens manufacturing apparatus according to claim 1, wherein each of the cutting blades has a linear shape and is supported in a direction forming an angle about the moving direction of the unevenness forming unit.

* * * * *